US007528215B2

(12) United States Patent
Shigematsu et al.

(10) Patent No.: US 7,528,215 B2
(45) Date of Patent: May 5, 2009

(54) ALIPHATIC POLYMER HAVING KETONE GROUP AND ETHER BONDING IN ITS MAIN CHAIN AND RESIN COMPOSITION CONTAINING THE SAME

(75) Inventors: Taishi Shigematsu, Ashigarakami-gun (JP); Chikara Manabe, Ashigarakami-gun (JP); Masaki Hirakata, Ashigarakami-gun (JP); Kentaro Kishi, Ashigarakami-gun (JP); Miho Watanabe, Ashigarakami-gun (JP); Hiroyuki Watanabe, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 491 days.

(21) Appl. No.: 10/567,907

(22) PCT Filed: Apr. 30, 2004

(86) PCT No.: PCT/JP2004/006338

§ 371 (c)(1),
(2), (4) Date: Feb. 10, 2006

(87) PCT Pub. No.: WO2005/042618

PCT Pub. Date: May 12, 2005

(65) Prior Publication Data

US 2006/0287470 A1 Dec. 21, 2006

(30) Foreign Application Priority Data

Oct. 31, 2003 (JP) ............................. 2003-373288

(51) Int. Cl.
*C08G 2/00* (2006.01)
*C08G 61/00* (2006.01)
*C08G 65/34* (2006.01)
*D06P 1/52* (2006.01)

(52) U.S. Cl. ........................ 528/220; 528/425; 528/396; 528/495

(58) Field of Classification Search ................ 528/220, 528/396, 425, 495
See application file for complete search history.

(56) References Cited

U.S. PATENT DOCUMENTS

| | | | | | |
|---|---|---|---|---|---|
| 3,849,515 | A | * | 11/1974 | Muller | 528/274 |
| 4,187,355 | A | * | 2/1980 | Wagner | 521/158 |
| 4,275,244 | A | * | 6/1981 | Helfert et al. | 568/624 |
| 4,609,763 | A | * | 9/1986 | Griggs et al. | 568/342 |
| 4,649,082 | A | * | 3/1987 | Friedlander | 428/461 |
| 4,820,794 | A | * | 4/1989 | Darnell et al. | 528/271 |
| 4,835,250 | A | | 5/1989 | Drent | |
| 4,841,020 | A | * | 6/1989 | Drent | 528/392 |
| 4,940,758 | A | * | 7/1990 | Wong | 525/539 |
| 4,980,514 | A | * | 12/1990 | Sanderson et al. | 568/405 |
| 5,072,050 | A | * | 12/1991 | Sanderson et al. | 568/314 |
| 5,099,073 | A | * | 3/1992 | Sanderson et al. | 568/405 |
| 5,120,879 | A | * | 6/1992 | Sanderson et al. | 568/405 |
| 5,162,493 | A | * | 11/1992 | Drent | 528/392 |
| 5,433,877 | A | * | 7/1995 | Kono et al. | 252/62.2 |
| 5,684,117 | A | * | 11/1997 | Londa et al. | 528/220 |
| 5,703,201 | A | * | 12/1997 | Hanna | 528/392 |
| 5,952,438 | A | * | 9/1999 | Kratz et al. | 525/471 |
| 6,222,009 | B1 | * | 4/2001 | Grant, Jr. | 528/485 |
| 6,245,437 | B1 | * | 6/2001 | Shiiki et al. | 428/483 |
| 6,277,929 | B1 | * | 8/2001 | Kitahara et al. | 525/440.072 |
| 6,528,572 | B1 | * | 3/2003 | Patel et al. | 524/495 |
| 6,770,736 | B1 | * | 8/2004 | Haftka et al. | 528/396 |
| 6,794,035 | B2 | * | 9/2004 | Tobita et al. | 428/402 |
| 7,166,754 | B2 | * | 1/2007 | Ferreira et al. | 568/815 |
| 7,208,145 | B2 | * | 4/2007 | McManus et al. | 424/78.27 |
| 7,223,829 | B2 | * | 5/2007 | Kato et al. | 528/220 |
| 2002/0007043 | A1 | | 1/2002 | Sunkara et al. | |
| 2002/0035238 | A1 | * | 3/2002 | Nakamura et al. | 528/425 |
| 2003/0032688 | A1 | * | 2/2003 | Hotta et al. | 521/130 |
| 2003/0064017 | A1 | * | 4/2003 | Tobita et al. | 423/447.2 |
| 2003/0064216 | A1 | * | 4/2003 | Tobita et al. | 428/323 |
| 2003/0069390 | A1 | * | 4/2003 | Satoh et al. | 528/425 |

(Continued)

FOREIGN PATENT DOCUMENTS

EP 0 599 415 A1 6/1994

(Continued)

*Primary Examiner*—Mark Eashoo
*Assistant Examiner*—Liam J Heincer
(74) *Attorney, Agent, or Firm*—Oliff & Berridge, PLLC

(57) ABSTRACT

The invention provides an aliphatic polymer having a ketone group and ether bonding in its main chain, characterized by comprising structural units represented by the Formula (1) and by the Formula (2).

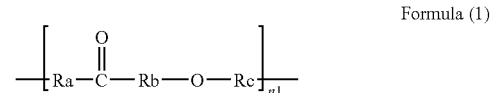

Formula (1)

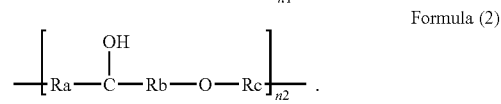

Formula (2)

In the Formulae (1) and (2), Ra and Rb each independently represents a substituted or unsubstituted divalent aliphatic hydrocarbon group. Rc represents a substituted or unsubstituted divalent aliphatic hydrocarbon group having ether bonding in a terminal thereof, or a single bond. N1 represents an integer of 1 or more. N2 represents an integer of 0 or more. And, n1+n2 is in a range of 2 to 1000. The polymer preferably contains ether bonds and ketone groups in a ratio of 0.01 to 100. The polymer can be substantially comprised of a structural unit represented by the Formula (1) as a repeating unit. A resin composition containing as a component structural units represented by the Formula (1) is also provided. The resin composition may further comprise an electrically conductive powder.

15 Claims, 4 Drawing Sheets

U.S. PATENT DOCUMENTS

| | | | |
|---|---|---|---|
| 2003/0096104 A1* | 5/2003 | Tobita et al. | 428/332 |
| 2003/0213939 A1* | 11/2003 | Narayan et al. | 252/500 |
| 2004/0167257 A1* | 8/2004 | Ryang | 524/262 |
| 2004/0170554 A1* | 9/2004 | Wadahara et al. | 423/447.2 |
| 2005/0192369 A1* | 9/2005 | Pazos et al. | 521/155 |
| 2006/0025544 A1* | 2/2006 | Koube et al. | 525/437 |
| 2006/0135738 A1* | 6/2006 | Taniguchi et al. | 528/220 |
| 2006/0182922 A1* | 8/2006 | Ishida et al. | 428/44 |

FOREIGN PATENT DOCUMENTS

| | | | |
|---|---|---|---|
| GB | 1458570 A | * | 12/1976 |
| JP | A-08-244176 | | 9/1996 |
| JP | A-09-059506 | | 3/1997 |
| JP | A-11-003931 | | 1/1999 |
| JP | A-11-181081 | | 7/1999 |
| JP | A-2003-517071 | | 5/2003 |
| JP | A-2004-059826 | | 2/2004 |
| JP | A-2004-182974 | | 7/2004 |

* cited by examiner

ALIPHATIC POLYMER HAVING KETONE GROUP AND ETHER BONDING IN ITS MAIN CHAIN AND RESIN COMPOSITION CONTAINING THE SAME

FIELD OF THE INVENTION

The present invention relates to a novel aliphatic polymer having a ketone group and ether bonding in its main chain, which is used as a structural material of a composition such as engineering plastic, and a resin composition containing the same.

BACKGROUND ART

Being organic materials which are stable and can be industrially produced, plastics have been used in various applications.

In particular, among plastics, so-called "engineering plastics", have excellent properties such as mechanical strength or heat resistance, in contrast to general plastics such as polyethylene or polystyrene, and so can be used in place of metallic materials. In recent years, engineering plastics have been put into practice in various industrial fields, being excellent functional materials. Among engineering plastics, polyamide, polyethylene terephthalate, polycarbonate, polyacetal, polyphenylene ether and the like are called "general purpose engineering plastics", and are able to provide reasonable performance and are inexpensive, and accordingly, are used in large quantities in industry.

Other than the general purpose engineering plastics, plastics having exceptional mechanical strength or heat resistance are called "special engineering plastics" or "super engineering plastics", and application thereof is limited due to cost or formability thereof.

Examples of the special engineering plastic include polyimides, polysulfones, all-aromatic polyesters, crystalline polyesters, polyketones, cyanates, polyphenylenesulfides, and the like.

Among engineering plastics, polyketone is a polymer having a ketone group in its main chain. Main examples of polyketone include polyether ketone (hereinafter, abbreviated as PEK), polyether ether ketone (hereinafter, abbreviated as PEEK), polyether ketone (hereinafter, abbreviated as PEKK), and polyallyl ether ketone or aliphatic polyketone composites thereof.

Polyallylether ketone is a heat-resistant polymer which can be injection molded. The ratio of rigid ketone groups to flexible ether bonding is a factor which determines the heat resistance of the polymer. Further, PEK or PEEK, having a high ratio of ketone groups, have high heat resistance. Thermal deformation temperatures of PEK and PEEK range from about 300° C. to about 350° C., and continuous duty temperatures thereof range from about 200° C. to about 260° C., and among thermal plastics, PEK and PEEK exhibit the best heat resistance. PEEK has a melting point of 334° C., and exhibits high resistance to hydrolysis, high chemical resistance, high radiation resistance, and fire resistance, and accordingly, is used in air planes, the field of atomic power generation, electronics such as computers, cable-coating materials, connectors, parts surrounding the engine in automobiles, and a hydrothermal-pump housing and the like. Heat resistance, chemical resistance, fire resistance, and radiation resistance of PEK are higher than those of PEEK, and PEK is used in atomic power generation and air plane-associated parts.

However, since these engineering plastics use expensive monomers as raw materials, there is little room for cost reduction, thus it is not expected that a large market for them will develop in the future.

Condensation based engineering plastics containing aromatic rings in their main chains have conventionally been synthesized by condensation reactions between two functional groups. However, in recent years, new synthesizing methods in which large ring compounds are polymerized by ring-opening or they are directly polymerized by dehydrogenation have been reported.

Further, attention has been drawn to polyketones which do not contain an aromatic ring in their molecules, which are so-called aliphatic polyketones. An aliphatic polyketone ("CALIRON"(trade name)), which is a special engineering plastic developed and manufactured by Shell Oil Co., Ltd., does not contain an aromatic ring in its molecule and can be manufactured from inexpensive raw materials such as olefin such as ethylene and CO, hence a wide range of applications can be expected. Examples of applications of aliphatic polyketones include packaging, containers, electric materials, electronic components, automobile materials, building materials, gears, sliding parts, adhesives, and fibers, and aliphatic polyketones are of interest in these industrial fields.

At present, aliphatic polyketones are mainly synthesized by a method in which an olefin, such as ethylene or propylene, and carbon monoxide are copolymerized by using a metal complex such as palladium, nickel or cobalt, as a catalyst (see U.S. Pat. No. 4,835,250 for example).

However, at present, the synthesis of these metal complexes is extremely difficult. For instance, C. Bianchini, et. al., Marcromolecules 32, pp. 4183-4193 (1999) discloses a synthesis method of a palladium complex. However, since the disclosed synthesis has the problem of requiring conduction of a complicated reaction process comprising 5 steps or more, methods of synthesizing stable aliphatic polyketones in this way are still at a developing stage.

At present there has been no report of an example of a synthesis of an aliphatic polymer having a ketone group and ether bonding in its main chain, such as aliphatic polyether ketone or aliphatic polyether ether ketone, an aliphatic polyketone for which a wide range of applications is expected.

DISCLOSURE OF THE INVENTION

The present invention solves the above-described conventional problems, and accomplishes the following objects. Namely, the present invention provides an aliphatic polymer having a ketone group and ether bonding in its main chain, which can be used as a structural material of a composition typical of engineering plastics.

Further, the present invention provides a resin composition containing the aliphatic polymer having a ketone group and ether bonding in its main chain as a structural component.

In other words, the present invention relates to an aliphatic polymer having a ketone group and ether bonding in its main chain, wherein the aliphatic polymer comprises structural units represented by the following Formula (1) and the following Formula (2):

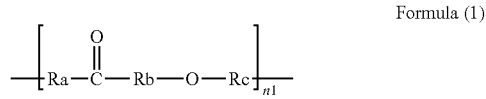

Formula (1)

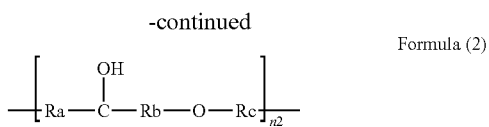

Formula (2)

In the Formulae (1) and (2), Ra and Rb each independently represents a substituted or unsubstituted divalent aliphatic hydrocarbon group; Rc represents a substituted or unsubstituted divalent aliphatic hydrocarbon group having ether bonding in a terminal thereof, or a single bond; n1 represents an integer of 1 or more; n2 represents an integer of 0 or more; and n1+n2 is in a range of 2 to 1000.

The present invention further provides the polymer, wherein, in the structural units represented by the Formula (1) and the Formula (2), Ra and Rb each represents $CH_2$, and Rc is a single bond.

The present invention further provides the polymer, wherein, in the structural units represented by the Formula (1) and the Formula (2), Ra and Rb each represents $CH_2$, and Rc represents —$(CH_2)$m-O—, wherein m represents an integer of 1 to 20.

The present invention further provides the polymer, wherein an weight-average molecular weight is in a range of 74 to 1,000,000.

The present invention further provides the polymer, wherein the terminal is selected from a group comprising —OH, —COOH, —COOR, —COX, —$NH_2$ and NCO, wherein R represents a substituted or unsubstituted hydrocarbon group, and X represents a halogen atom.

The present invention further provides the polymer, wherein the polymer has a cross-linking structure.

The present invention further provides the polymer, wherein a ratio of ether bonding to ketone groups represented by ether bonding/ketone groups is in a range of 0.01 to 100.

The present invention further provides the polymer, wherein the polymer is substantially constituted of the structural unit represented by the Formula (1) as a repeating units.

The present invention further provides the polymer, wherein the polymer is obtained by conducting a polymerization-reaction of a polyhydric alcohol as a raw material in a presence of a catalyst.

The present invention provides the polymer, wherein the polymer is constituted of the structural units represented by the Formula (1), the Formula (2) and the following Formula (3):

Formula (3)

In the Formulae (1) to (3), Ra and Rb each independently represent a substituted or unsubstituted divalent aliphatic hydrocarbon group; Rc represents a substituted or unsubstituted divalent aliphatic hydrocarbon group having ether bonding in a terminal thereof, or a single bond; R1 and R2 each independently represents H or an alkyl group; n1, k and l each independently represents an integer of 1 or more, n2 represents an integer of 0 or more; and n1+n2 and l each independently represents an integer in a range of 1 to 1000.

The present invention according to another aspect provides a resin composition, wherein the resin composition includes the structural unit represented by the Formula (1) as a structural element.

The present invention further provides the resin composition, wherein the resin composition contains an electrically conductive powder.

The present invention further provides the resin composition, wherein the electrically conductive powder is metal fine particles.

The present invention further provides the resin composition, wherein the electrically conductive powder is carbon nanotubes.

The present invention further provides the resin composition, wherein the resin composition uses, as the electrically conductive powder, carbon nanotubes modified by a functional group which conducts a polymerization-reaction with an aliphatic polymer having a ketone group and ether bonding in its main chain.

The present invention further provides the resin composition, wherein the functional group is a carboxylic acid.

The resin composition of the present invention can be used as engineering plastic, and can be made to have electrical conductivity by containing electrically conductive powder therein. Further, if carbon nanotubes are used as electrically conductive powder as a filler, the resin composition can be given flexibility. Here, if carbon nanotubes which are modified by a functional group which conducts a polymerization-reaction with an aliphatic polymer having a ketone group and ether bonding in its main chain are used, a resin composition with a high density composition can be obtained.

BEST MODE FOR CARRYING OUT THE INVENTION

Figure 1:
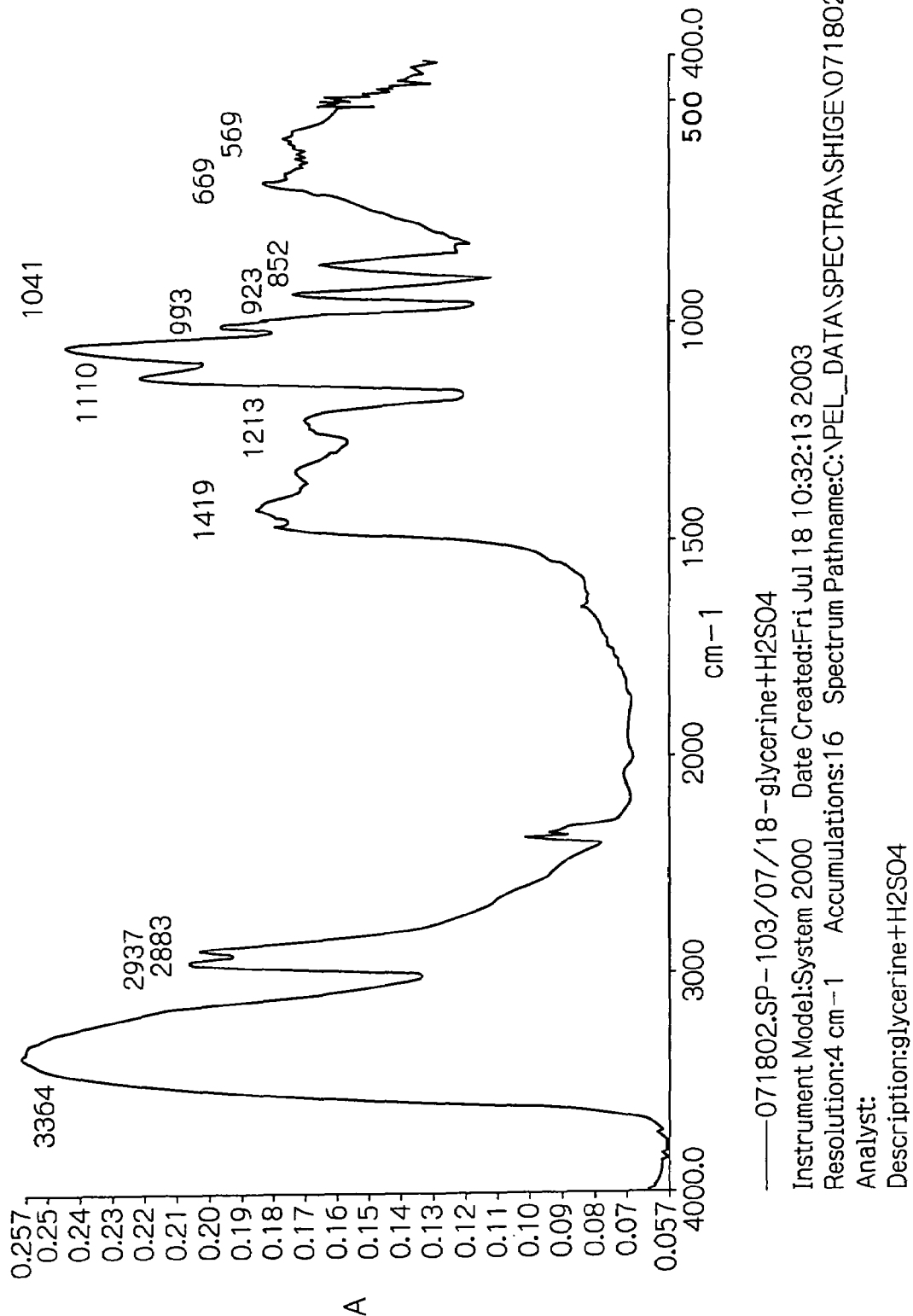
FIG. 1 shows an infrared absorption spectrum of a mixture of glycerin and sulfuric acid used in Example 1.

Hereinafter, a detailed description of the present invention will be made. Aliphatic polymer having a ketone group and ether bonding in its main chain An aliphatic polymer having a ketone group and ether bonding in its main chain of the present invention is a polymer which is constituted by two structural units represented by the following Formula (1) and the following Formula (2), as a basic skeleton, and which does not contain an aromatic ring. Because the aliphatic polymer having a ketone group and ether bonding in its main chain of the present invention has ketone groups, which are responsible for hardening a polymer, and ether bonding, which is responsible for softening a polymer, it is possible for example that by controlling the respective numbers of ketone groups and amount of ether bonding to control the mechanical properties such as the hardness and the like, while maintaining the aliphatic polymer thermally stable. This makes it a useful structural material of a composition such as an engineering plastic.

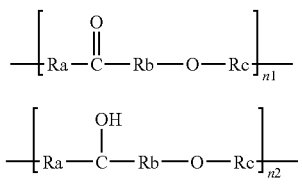

Formula (1)

Formula (2)

In the Formula (1) and the Formula (2), Ra and Rb each independently represents a substituted or unsubstituted divalent aliphatic hydrocarbon group, Rc represents a substituted or unsubstituted divalent aliphatic hydrocarbon group having an ether bonding in a terminal thereof, or a single bond, n1 represents an integer of 1 or more and n2 represents an integer of 0 or more, and n1+n2 is an integer in a range of 2 to 1000.

Further, the value of n1+n2, corresponding to the number of the structural units of the aliphatic polymer having a ketone group and ether bonding in its main chain of the present invention, is preferably in a range of 2 to 100, and more preferably in a range of 2 to 50.

As the aforementioned divalent aliphatic hydrocarbon group, those having 1 to 20 carbon atoms can be used. Such an aliphatic hydrocarbon group may be in a state of a straight chain, a branch chain or an annular chain. However, a straight-chain aliphatic hydrocarbon group is preferable. As a straight-chain aliphatic hydrocarbon group, an alkyl chain having 1 to 20 carbon atoms can be used. Further, as a divalent aliphatic hydrocarbon group having an ether bonding in a terminal thereof, these aliphatic hydrocarbon groups with an ether bonding (—O—) in a terminal thereof can be used.

Further, examples of substituents that can be substituted in the divalent aliphatic hydrocarbon group include: —COOR, —COX, —MgX, —X, —OR, —NR1R2, —NCO, —NCS, —COOH, —OH, —O, —NH$_2$, —SH, —SO$_3$H, —R'CHOH, —CHO, —CN, —COSH, —SR, and —SiR'$_3$. Here, X represents a halogen, and R, R1, R2, and R' each independently represents a substituted or unsubstituted hydrocarbon group.

Ra and Rb each independently represents a substituted or unsubstituted divalent aliphatic hydrocarbon group, and specific examples thereof include: —CH$_2$—, —CHNH$_2$—, —, —C(NH$_2$)$_2$—, —CHCN—, —C(CN)$_2$—, —CHOH—, —C(OH)$_2$—, —CO—, —CHSH—, —C(SH)$_2$—, —CHCOOH—, —(COOH)$_2$—, —CHX—, and —CX$_2$—, and repetitions or combinations thereof can be used. Here, X represents a halogen.

On the other hand, specific examples of Rc include a single bond or substituted or unsubstituted divalent aliphatic hydrocarbon groups each expressed by a single bond, or —Rc'—O— and each having an ether bonding in the terminals thereof. Examples of Rc' include: —CH$_2$—, —CH$_2$—, —CHNH$_2$—, —C(NH$_2$)$_2$—, —CHCN—, —C(CN)$_2$—, —CHOH—, —C(OH)$_2$—, —CHSH—, —C(SH)$_2$—, —CHCOOH—, —C(COOH)$_2$—, —CHX—, and —CX$_2$—, and repetitions or combinations thereof can be also used. Further, repetitions of —Rc'—O— or combinations of a plurality of —Rc'—O— structures having different Rc's can be used. Here, X represents a halogen.

The structural units represented by the aforementioned Formulae (1) and (2) are preferably constituted by the structural units represented by the following Structural Formula (1) and the following Structural Formula (2):

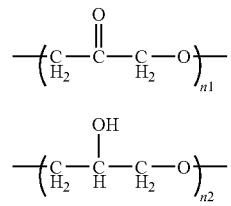

Structural Formula (1)

Structural Formula (2)

Further, a structural unit represented by the following Structural Formula (3) is also preferable. Here, m is an integer of 1 to 20. Moreover, another structural unit which is used in combination therewith is that in which a ketone group in Structural Formula (3) is merely substituted by a hydroxyl group, and a description thereof will be omitted.

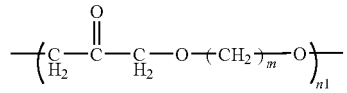

Structural Formula (3)

In addition, an example of the structural unit represented by the Formula (1) can include a structural unit represented by the following Structural Formula. Further, the structural unit represented by the Formula (2) is that in which a ketone group in the Formula (1) is substituted by a hydroxyl group, and a description thereof will be omitted. Here, in the following Structural Formulas, m1, m2 and m3 each independently represents an integer of 1 to 20, and the sum of n1 and n2, i.e., n1+n2, is in a range of 2 to 1000 (n1 is the number of structural units in which a ketone group is substituted by a hydroxyl group).

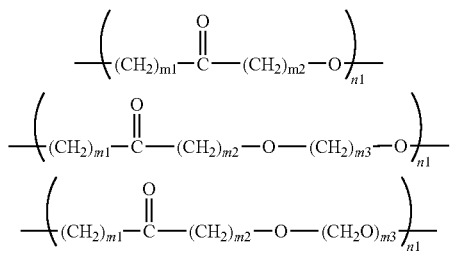

The terminal of an aliphatic polymer having a ketone group and an ether bonding in its main chain of the present invention can be selected from a group comprising —OH, —COOH, —COOR (R represents a substituted or unsubstituted hydrocarbon group), —COX (X represents a halogen atom), —NH$_2$ and NCO.

The weight-average molecular weight of the aliphatic polymer having a ketone group and ether bonding in its main chain of the present invention is preferably in a range of 74 to 1,000,000, more preferably in a range of 74 to 100,000, and further preferably in a range of 74 to 5,000.

In particular, the weight-average molecular weight of the aliphatic polymer having a ketone group and ether bonding in its main chain, constituted by the Structural Formula (1) and the Structural Formula (2) is preferably in a range of 74 to 80,000, more preferably in a range of 74 to 8,000, and further preferably in a range of 74 to 4,000.

Further, the weight-average molecular weight of the aliphatic polymer having a ketone group and ether bonding in its main chain, which is constituted by the Structural Formula (3) and a structure in which a ketone has been substituted by a hydroxyl group in the Structural Formula (3) is preferably in a range of 230 to 250,000, more preferably in a range of 230 to 130,000, and further preferably in a range of 230 to 70,000.

The ratio of the number of ketone groups to the number of ether bonds in the aliphatic polymer having a ketone group and ether bonding in its main chain of the present invention (ether bonding/ketone groups) is preferably in a range of 0.01 to 100, and more preferably in a range of 0.04 to 25.

Further, as described below, a ketone group enhances the hardness of a polymer while an ether bonding enhances the flexibility of a polymer. Accordingly, the mechanical strength of the composition can be controlled by controlling the number of ketone groups and that of ether bondings in the resin composition of the present invention.

The aliphatic polymer having a ketone group and ether bonding in its main chain of the present invention is structured by two structural units represented by the Formula (1) and the Formula (2). However, the aforementioned aliphatic polymer can be a polymer structured merely by the Formula (1) as a repeating unit. Further, the aliphatic polymer can be a polymer in which only structural units having the same structure are constituted as repeating structural units or a polymer of structural units represented by the Formula (1) in which Ra, Rb or Rc have different structures polymerized together.

The aliphatic polymer having a ketone group and an ether bonding in its main chain of the present invention may be a polymer comprising a structural unit represented by the Formula (1), a structural unit represented by the Formula (2) and another structural unit (which does not contain an aromatic group, however).

Specific examples of these polymers include: a polymer structured by structural units represented by the Formula (1) and the Formula (2), and polyether represented by the following Formula (3), or a block copolymer having these structural units as a component (block copolymer comprising polyether ketone site(s), site(s) in which a ketone group in polyether ketone is substituted by a hydroxyl group, and polyether site(s)). In the polymer formed by these polymerized bodies, in the following Formulae (1), (2) and (3), n1, k and l each independently represents an integer of 1 or more, n2 is an integer of 0 or more, k is an integer of 1 to 20, and n1+n2 is an integer in a range of 1 to 1,000 (preferably, integer of 1 to 500), l is an integer in a range of 1 to 1,000 (preferably, an integer of 1 to 500). Herein in the Formula (3), R1 and R2 each independently represents H or an alkyl group.

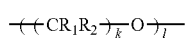

Formula (3)

The aliphatic polymer having a ketone group and ether bonding in its main chain may have a cross-linking structure. By forming a cross-linking structure in which a ketone group and an ether bonding are combined with each other, it becomes possible to obtain a more mechanically and thermally stable composition. An example of the polymer includes a cross-linking body in which the structural unit represented by the Formula (1) is cross-linked by using glycerin or aliphatic diol. A specific example of the polymer includes a cross-linking body in which the structural unit represented by the Structural Formula (1) is cross-linked with glycerin or an aliphatic diol compound, as represented by the following structure:

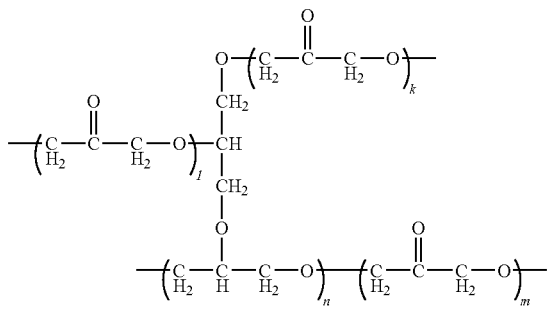

When the aliphatic polymer having a ketone group and ether bonding in its main chain tends towards a state in which the aliphatic polymer does not contain hydroxyl groups, the aliphatic polymer becomes a polymer which is extremely chemically stable. On the other hand, by the aliphatic polymer having a ketone group and ether bonding in its main chain containing hydroxyl group(s), the aliphatic polymer having a ketone group and ether bonding in its main chain becomes a gel polymer (high polymer gel) having stable water-solubility. Since the gel polymer has viscosity, and does not easily flow during application or formation thereof, the gel polymer is suitable for preparing films or structural substances. By heating after application or formation, the gel polymer can be easily hardened into a desired configuration and a resin composition comprising a polymer having a cross-linking structure formed therein can be obtained. Further, this hydroxyl group can be chemically modified by a molecule having a functional group that can react with the hydroxyl group.

The hydroxyl group can be contained in the structural unit represented by the Formula (1) in a state in which hydroxyl group(s) remained as not having been completely synthesized as ketone groups. In other words, the chain for structuring aliphatic polymer having a ketone group and ether bonding in its main chain of the present invention can include a structural unit represented by the following Formula (4). Further, since the hydroxyl group is in a state remaining as not completely synthesized as a ketone group, the structural unit represented by the following Formula (4) is partially included in the structural unit represented by the Formula (1).

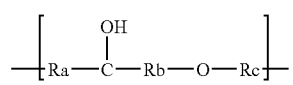

Formula (4)

In the Formula (4), Ra and Rb each independently represents a substituted or unsubstituted divalent aliphatic hydrocarbon group, and Rc represents a substituted or unsubstituted divalent aliphatic hydrocarbon group having ether bonding in a terminal thereof, or a single bond. Further, Ra, Rb and Rc in the Formula (4) are the same as those in the Formula (1).

Further, a hydroxyl group can be included in another structural unit with which the structural unit represented by the Formula (1) constitutes a block copolymer. Specific examples thereof include the following structure in which a hydroxyl group can be included in a polyether site of a block copolymer of polyether ketone comprising the structural unit represented by the Structural Formula (2), and polyether (a polymer of the structural unit represented by the Formula (1) and the structural unit represented by the Formula (3)).

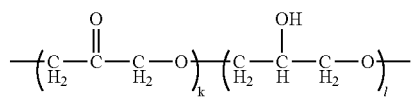

As described above, the above-described aliphatic polymer having a ketone group and ether bonding in its main chain of the present invention can be suitably used for a structural material such as engineering plastic. Besides, a resin composition containing the aliphatic polymer having a ketone group and ether bonding in its main chain can be suitably used.

Method of Preparing a Composition Containing the Aliphatic Polymer having a Ketone Group and Ether Bonding in its Main Chain The aliphatic polymer having a ketone group and ether bonding in its main chain of the present invention can be obtained by a polymerization-reaction by using a polyhydric alcohol as a raw material in the presence of a catalyst, and can be prepared inexpensively by using a polyhydric alcohol as a raw material in place of petroleum thus making it possible to obtain the same by a preparation method that is suitable for an industrial production.

The aliphatic polymer having a ketone group and ether bonding in its main chain of the present invention can be obtained by a polymerization-reaction accompanied by dehydration reaction and oxidation reaction. Catalyst for generating such reactions can be selected from the group comprising sulfuric acid, nitric acid, hydrogen peroxide, $Na_2Cr_2O_7$, $CrO_3Cl$, and $NaOCl$. Use of sulfuric acid as a catalyst is particularly preferable because the sulfuric acid can facilitate effectively occurrences of dehydration reaction and oxidation reaction, be prepared inexpensively, and is easy to handle.

In preparing rigid plastics with high density, an amount in which the catalyst is used (or added) is preferably in a range of 0.1 to 100 mg per 1 g of raw material, more preferably in a range of 0.5 to 80 mg, and further preferably in a range of 5 to 50 mg. If the amount of the catalyst is too small, the generation of the polymerization-reaction becomes difficult. Meanwhile, if the amount of the catalyst is too great then foaming in the resultant plastic can occur. On the contrary, if the catalyst is to be used for foamed plastic then the amount of the catalyst is made larger than the amount of the catalyst can be increased compared with the above.

As a polyhydric alcohol raw material, a polyhydric alcohol containing a secondary alcohol and a primary alcohol in a single molecule is preferable. Examples of the polyhydric alcohol include: glycerin, 1,3,5-trihydroxypentane, and 1,2,4-trihydroxybutane, and 1,2,6-trihydroxyhexane.

In the aliphatic polymer having a ketone group and ether bonding in its main chain, generally, a ketone group enhances the hardness of a polymer, while an ether bonding enhances the flexibility of the polymer. Accordingly, by controlling the number of ketone groups and ether bonds, mechanical properties such as the hardness and the like of a composition comprising the polymer can be controlled. In other words, the higher the ratio of the number of ether bonds in the polymer, the more flexible the composition comprising a polymer becomes. On the contrary, the higher the ratio of the number of ketone groups, the higher the hardness of the composition comprising the polymer becomes.

However, the ketone groups are produced only from the polyhydric alcohol raw material. For this reason, when a mixture of a polyhydric alcohol and a diol compound (such as ethylene glycol) mixed therewith is used as a raw material, and polymerized, only ether bonding is generated from the diol compound, whereby the ratio of the number of ether bonds in a polymer molecule can be increased. Accordingly, by changing of the ratio of the mixture of the polyhydric alcohol with the diol compound, the flexibility of the composition comprising the polymer can be controlled.

More specifically, for example, when glycerin, as the polyhydric alcohol, and a diol compound are polymerized, if the polyhydric alcohol and the diol compound are alternately polymerized, as represented by the following reaction formula, polyether ether ketone can be obtained.

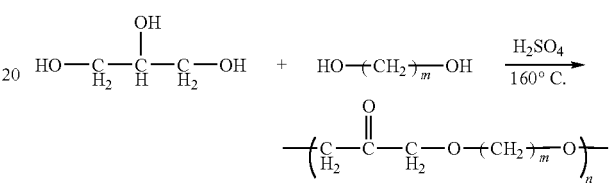

Further, when m molecules of glycerin, as a polyhydric alcohol, are polymerized, and thereafter, k molecules of diol compound are polymerized therewith, a block copolymer of polyether ketone and polyether can be obtained.

By conducting the polymerization-reaction such that hydroxyl groups remain, for example, as described above, it becomes possible to obtain a gel substance having stable water solubility, as the aliphatic polymer having a ketone group and ether bonding in its main chain.

Specifically, for example, if nitric acid is used as a catalyst, since a boiling point of nitric acid is 120° C., the catalyst (nitric acid) is heated at a temperature of 120° C. or higher, and the nitric acid as the catalyst is removed before all of the raw material (such as glycerin or diol) is polymerized, whereby a gel state high polymer in which —OH partially remains, without being synthesized as a ketone group, can be obtained.

It is suitable to use and heat the above-described catalyst in order to generate a polymerization-reaction. Means for heating treatments are not particularly limited. However, heating by electromagnetic waves is preferable because effective polymerization-reaction can be made to occur.

With reference to specific examples, the aliphatic polymer having a ketone group and ether bonding in its main chain of the present invention can be obtained by a reaction mechanism as described below. For example, if glycerin is used as a raw material, while sulfuric acid is used as a dehydration catalyst, the reaction mechanism is conducted through a dehydration-condensation reaction between primary alcohols and oxidation reaction with a secondary alcohol as expressed in the following reaction formula. In the dehydration-condensation reaction, an $H_2O$ molecule is eliminated from two primary alcohols of a glycerin molecule due to a dehydration effect of the sulfuric acid to generate ether bonding. In the oxidation reaction, two hydrogen atoms are eliminated from H—C—OH, which is the secondary alcohol, whereby a ketone group is produced. The resultant product is an aliphatic polyether ketone. Here unreacted hydroxyl group(s) may be present therein as described above. Further, the hydroxyl group can be chemically modified by a molecule having a functional group which can react with the hydroxyl group. Moreover, dehydration-condensation of the hydroxyl group can be conducted between a primary alcohol and a secondary alcohol, and dehydration-condensation of the hydroxyl group can further be conducted between secondary alcohols.

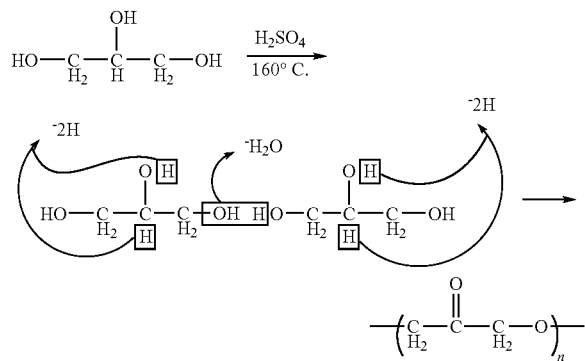

In this way, the aliphatic polymer having a ketone group and ether bonding in its main chain, which can be used for a material for constituting a resin composition such as engineering plastic, can be simply synthesized from inexpensive raw materials.

Resin Composition

The resin composition of the present invention contains the structural unit represented by the Formula (1) as a component. Specific examples of the resin composition include a resin composition comprising the aliphatic polymer having a ketone group and ether bonding in its main chain, or a resin composition comprising a cross-linking structural body in which an aliphatic polymer having a ketone group and ether bonding in its main chain and a hydroxyl group (or a mixture thereof with glycerin and an aliphatic diol) in a gel state is coated or formed, and thereafter, hardened, and the like.

The resin composition of the present invention can be used as various engineering plastics by changing the ratio of the number of the ketone groups to that of the ether bondings as described above. Further, the configuration of the resin composition is not particularly limited, and it can be a molded body having an arbitrary configuration, or can be a film. In particular, the aliphatic polymer having a ketone group and ether bonding in its main chain having a hydroxyl group and a gel state may be, for example, applied onto a substrate, and then cross-linked, whereby a film whose thickness is in a range of 1 nm to 1 mm, for example, can be easily formed.

Electrically conductive powder can be contained in the resin composition of the present invention. There is no particular limitation to how the electrically conductive powder is contained in the resin composition. The electrically conductive powder is preferably contained in the aliphatic polymer having a ketone group and ether bonding in its main chain. The resin composition, containing therein electrically conductive powder, can be used for materials for electrical applications such as electrodes (including those for electrically chemical measurements), electromagnetic shielding, or films.

As the electrically conductive powder, metal fine particles such as copper, gold or silver can be appropriately used. The embodiment of the inclusion of the electrically conductive powder is not limited to that of being uniformly dispersed in a resin composition, and that in which the surface density of the electrically conductive powder is higher than that of other portions can also be used.

Carbon nanotubes can be used as the electrically conductive powder. Carbon nanotubes have not only high electrical conductivity but also heat conductivity, and since carbon nanotubes are a cage substance, they have both rigidity and flexibility. For this reason, by containing carbon nanotubes in the resin composition of the present invention, electrical conductivity and flexibility of the resin composition can be improved, whereby the resin composition can be used for a wider range of applications. When carbon nanotubes to which a functional group that conducts a polymerization-reaction with the aliphatic polymer having a ketone group and ether bonding in its main chain is connected are mixed with a polyhydric alcohol, so as to form a polymer that is used as a raw material of the resin composition, during the formation of the polymer, polymerization of the polyhydric alcohol and the functional group connected to the carbon nanotubes and polymerization of the polyhydric alcohol and substituents that remain in the polymer may occur in addition to copolymerization of polyhydric alcohols.

Accordingly, a polymer thus formed forms a resin composition having a composite structure formed by the aliphatic polymer having a ketone group and ether bonding in its main chain, the carbon nanotubes, and the polymer of the polyhydric alcohol. For this reason, since it is difficult to specify and express the chemical structural formula of the resin composition, the chemical structural state is described as being a resin composition that "uses carbon nanotubes, which are modified by a functional group which conducts polymerization-reaction with the aliphatic polymer having a ketone group and ether bonding in its main chain, as an electrically conductive powder". Then, the resin composition obtained as described above is in a state in which the polymer and carbon nanotubes are a composite, thus the resin composition can exhibit high flexibility and high heat resistance.

Examples of the functional groups for modifying the carbon nanotubes for generating a polymerization-reaction between the carbon nanotubes and the polyhydric alcohol which becomes a raw material of the polymer include: —COOR, —COX and —NCO (R represents a substituted or unsubstituted hydrocarbon group, and X represents a halogen atom). When —COOH, which can comparatively easily modify the carbon nanotubes, is selected, polymerization occurs with high density. As a result thereof, formation of a structure having a high degree of combination can be formed, and properties of the polymer can be enhanced.

It does not matter if the carbon nanotubes are single layer-carbon nanotubes or multi layer-carbon nanotubes having two or more layers. Either one or both (i.e., a mixture) of single layer-carbon nanotubes or multiplayer-carbon nanotubes can be arbitrarily selected. Further, carbon nano horns which is a variation of single layer carbon nanotubes (which are formed into horn shapes whose outer circumference is continuously increased from one end to the other), carbon nano coils (which are formed into coil shapes whose overall shape is a spiral), carbon nano beads (which have tubes at the center thereof and penetrate spherical bead structureds of amorphous carbon or the like), cup stack-shaped nanotubes, or carbon nanotubes which are not substantially formed into a tube configuration such those whose outer circumference is covered with a carbon nano horn and amorphous carbon, can be used as the carbon nanotubes.

Examples of the carbon nanotubes further include those in which a certain substance is encapsulated, such as metal-encapsulating nanotubes in which metal or the like is encapsulated in carbon nanotubes, or peapod nanotubes in which fullerene or metal-encapsulating fullerene is encapsulated in carbon nanotubes.

As described above, in the present invention, carbon nanotubes which are formed into any arbitrary configurations, such as typical carbon nanotubes, variations thereof or those modified in various ways can be used without any problem with respect to reactivity. Consequently, all of the above-described carbon nanotubes are incorporated into the scope of the "carbon nanotubes" according to the present invention.

On the other hand, conventionally, in preparing a structural body for the purpose of obtaining an effect from an interaction between the carbon nanotubes by collecting them together and placing them in contact, the structural body must be sealed with a resin or the like in order to obtain a stable structural body, otherwise the accumulated carbon nanotubes fly in all directions. Further, in the case in which the structural body is sealed with a resin, during the coating of the resing carbon nanotubes can flow away before a patterning process is carried out, and resin can flow between portions where carbon nanotubes contact with each other, to thereby inhibit carbon nanotubes from contacting with each other. Thus, it has been impossible to use the effectiveness of the carbon nanotubes.

If a dispersion solution, in which carbon nanotubes have been dispersed in a resin solution in advance, is applied to a substrate, unless the concentration of carbon nanotube is considerably high, carbon nanotubes are brought into contact with each other only at local portions or set in a dispersed state.

Therefore, during the synthesis of the aliphatic polymer having a ketone group and ether bonding in its main chain, for example, carbon nanotubes are dispersed in a polyhydric alcohol (e.g., glycerin) raw material, and a catalyst (e.g. sulfuric acid) is added to this. If polymerization is initiated by using the above-described method in this state, a structural body filled with carbon nanotubes at high density can be prepared.

At this time, in order to improve the dispersion ratio of the carbon nanotubes in the polyhydric alcohol raw material (hereinafter, glycerin is used as the representative material), and in order to improve a bonding force between the carbon nanotube and the polymer by conducting a chemical bonding between the aforementioned polymer molecule and the carbon nanotube, use of a material in which a functional group such as —COOH group, which conducts a polymerization-reaction with a polyhydric alcohol or the aliphatic polymer having a ketone group and ether bonding in its main chain, has been added to carbon nanotubes is preferable.

If the functional group of a bonding site in which a plurality of carbon nanotubes and the polymer molecules are bonded to each other is —COOR (R is a substituted or unsubstituted hydrocarbon group), and when glycerin is used as the polymer raw material, then if two hydroxyl groups therein contribute to a chemical bonding to the carbon nanotube, the chemical structure becomes —COOCH$_2$CHOHCH$_2$OCO— or —COOCH$_2$CH(OCO—)CH$_2$OH. And if three hydroxyl groups contribute to chemical bonding to the carbon nanotubes, the chemical structure becomes —COOCH$_2$CH(OCO—)CH$_2$OCO—. The chemical structure at the cross-linking site can be either one selected from the two structures above.

In particular, if a film of the resin composition containing therein the carbon nanotubes is prepared, in a dispensing process in which a mixed solution, in which the carbon nanotubes having a functional group are dispersed in glycerin to which an appropriate amount of sulfuric acid has been added at room temperature, is supplied onto the surface of a substrate, a coating film is formed on the entire surface of the substrate or on a portion thereof by the mixed solution. Then, in subsequent polymerization, the resulting coating film is thermally cured, and a carbon nanotube film for constituting a composite structure in which plural carbon nanotubes and the polymer of the present invention are cross-linked with each other is formed.

The film-shaped carbon nanotube-containing resin composition layer is patterned into a pattern in accordance with its object. At this point, the carbon nanotube-containing resin composition layer itself is already made stable during the aforementioned polymerization. Since patterning is conducted with this state, there is no need to concern that carbon nanotubes scatter about during patterning, thus it is possible to pattern the carbon nanotube-containing resin composition layer into the desired pattern.

Examples of the patterning include the following two embodiments A and B described below can be listed:

Embodiment A comprises dry-etching regions of the carbon nanotube-containing resin composition layer outside the desired patterns for the substrate surface, and removing the carbon nanotube structural body layer in the dry-etched regions to thereby pattern the carbon nanotube-containing resin composition layer into the desired patterns.

Examples of an embodiment of patterning of the carbon nanotube-containing resin composition layer into the desired patterns include one which includes two separate processes of: mask layer-forming, to provide a mask layer (preferably, a resin layer such as a photoresist or a metal mask) on the carbon nanotube-containing resin composition layer in the region of the desired patterns; and removing the carbon nanotube-containing resin composition layer that is exposed in the regions outside the aforementioned desired pattern regions by dry-etching the substrate surface on which the carbon nanotube-containing resin composition layer and the mask layer are laminated (the dry-etching preferably uses irradiation of radicals of oxygen molecules, radicals of the oxygen molecules can be generated by irradiation with ultraviolet light onto oxygen molecules). In this case, if the mask layer provided during the mask layer-forming step is also a resin layer such as a photoresist, the removal step further comprises a resin stripping step of stripping a resin layer from the mask layer, whereby the patterned carbon nanotube-containing resin composition layer can be exposed.

An operation of patterning the carbon nanotube-containing resin composition layer into the desired patterns comprises an embodiment in which the carbon nanotube-containing resin composition layer is patterned into the desired patterns by selectively irradiating the carbon nanotube-containing resin composition layer in the region excluding the desired patterns for the substrate surface, with ions of gas molecules as ion beams, and removing the carbon nanotube-containing resin composition layer in the region.

Embodiment B comprises: printing patterns which accord to the purpose of the use on a surface of a substrate by preparing a solution in which carbon nanotubes are dispersed in glycerin or the like and a dehydrated catalyst such as sulfuric acid is added thereto (hereinafter, referred to as the carbon nanotube dispersion solution) or a gel in which carbon nanotubes are dispersed into a gel polymer and a dehydrated catalyst such as sulfuric acid is added thereto (hereinafter, referred to as the carbon nanotube dispersion gel); and thermally hardening the carbon nanotube dispersion solution or the carbon nanotube dispersion gel.

Either one of the embodiments A and B can be used for patterning.

In addition to the aliphatic polymer having a ketone group and ether bonding in its main chain of the present invention, another polymer (e.g., polyether) can be blended to the resin composition of the present invention. Further, the resin composition can be structured by blending the aliphatic polymers having a ketone group and ether bonding in their main chains of the present invention which have different structures (Ra, Rb, and Rc in the Formula (1) are different from one another) from each other.

Hereinafter, various properties of the resin composition of the present invention will be explained. However, the present invention is not limited to these.

A decomposition temperature of the polymer is preferably in a range of 300° C. to 600° C., and more preferably in a range of 350° C. to 600° C. The decomposition temperature can be measured by thermalgravimetric analysis.

A modulus of elasticity is preferably in a range of 0.1 GPa to 1000 GPa, and more preferably in a range of 1 GPa to 1,000 GPa. The modulus of elasticity can be calculated by the stress obtained by applying additional weight to a sample, and the distortion at that time.

An electrical conductivity is preferably in a range of $10^{-15}$ S/cm to 100 S/cm, and more preferably in a range of $10^{-10}$ S/cm to 100 S/cm. The electrical conductivity can be determined by the current-to-voltage properties and cross-sectional area of the sample.

Examples of another property of the resin composition of the present invention include insolubility to solvents such as water-, alcohol-, acetone-, ketone-, or halogen-containing solvents at normal temperature and pressure.

EXAMPLES

Hereinafter, with reference to Examples, the present invention will be described in more detail. However, the invention is not limited to these.

Example 1

Figure 2:
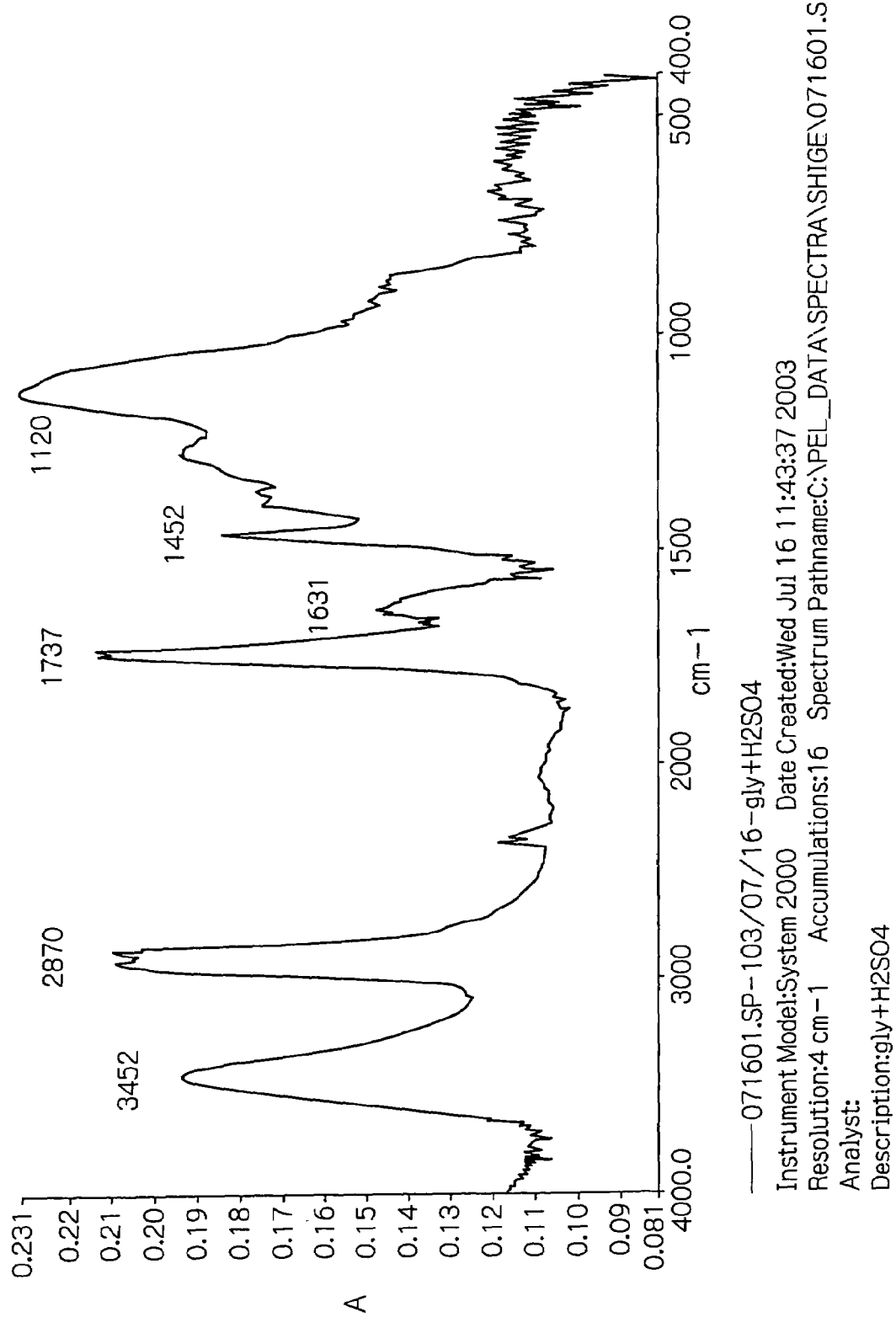
FIG. 2 shows an infrared absorption spectrum of aliphatic polyether ketone obtained in Example 1.

1 ml of glycerin (manufactured by KANTO CHEMICAL Co., Inc.) and 100 μl of concentrated sulfuric acid (a 60% of aqueous solution, manufactured by KANTO CHEMICAL Co., Inc.) are mixed as a raw material, and stirred thoroughly. 1 ml of this mixture is dripped onto a glass substrate, and the resultant is heated at a temperature of 160° C. for 15 minutes. In an infrared absorption spectrum of the product thus obtained (see FIG. 2), an absorption of a carbonyl group at 1737 cm$^{-1}$ which is not observed with an infrared absorption spectrum before heating and an absorption of an ether group at 1120 cm$^{-1}$ are observed (see FIG. 1). Accordingly, it is confirmed that an aliphatic polyether ketone structured by a structural unit represented by the Structural Formula (1) (n: 10, weight average molecular weight: 720, and a ratio of ether groups to ketone groups: 1/1) is obtained. Further, the results of analysis of elements reveals that the product is structured by C: 51 wt. %, H: 8 wt. %, and O: 41 wt. %. Since these values correspond closely to the values: C: 50 wt. %, H: 6 wt. %, and O: 44 wt. % calculated from the Structural Formula (1), it is confirmed that aliphatic polyether ketone comprising the structural unit represented by the Structural Formula (1) is obtained.

Various properties of the plastic comprising aliphatic polyether ketone are shown below:
Elasticity: 1 GPa
Thermal decomposition temperature: 380° C.
Electrical conductivity: $10^{-10}$ S/cm

Example 1-1

An aliphatic polyether ketone, in which carbon nanotube is dispersed, is obtained in the same manner as in Example 1 except that 0.15 g of carbon nanotube modified by a carboxylic acid is used as a raw material. The carbon nanotube modified by a carboxylic acid is synthesized as follows: 30 mg of multi-layer carbon nanotube powder (purity: 90%, average diameter: 30 nm, average length: 3 μm, manufactured by Science Laboratory) is added to 20 ml of concentrated nitric acid (60% aqueous solution, manufactured by KANTO CHEMICAL Co., Inc.). The resultant mixture is refluxed at a temperature of 120° C. for 20 hours, and carbon nanotube carboxylic acid is thus synthesized. After the temperature of the solution is returned to room temperature, the reaction solution is centrifuged at 5,000 rpm for 15 minutes, and separated into a supernatant and a precipitate. The precipitate collected is dispersed into 10 ml of pure water, and again centrifuged at 5,000 rpm for 15 minutes, and separated into a supernatant and a precipitate (the above being one washing operation). After the washing operation is repeated another 5 times, the precipitate is collected so as to obtain the carbon nanotubes modified by carboxylic acid.

Various properties of the plastic comprising aliphatic polyether ketone into which carbon nanotubes are dispersed are shown below:
Elasticity: 5 GPa
Thermal decomposition temperature: 380° C.
Electrical conductivity: $10^{-2}$ S/cm

Example 2

Figure 3:
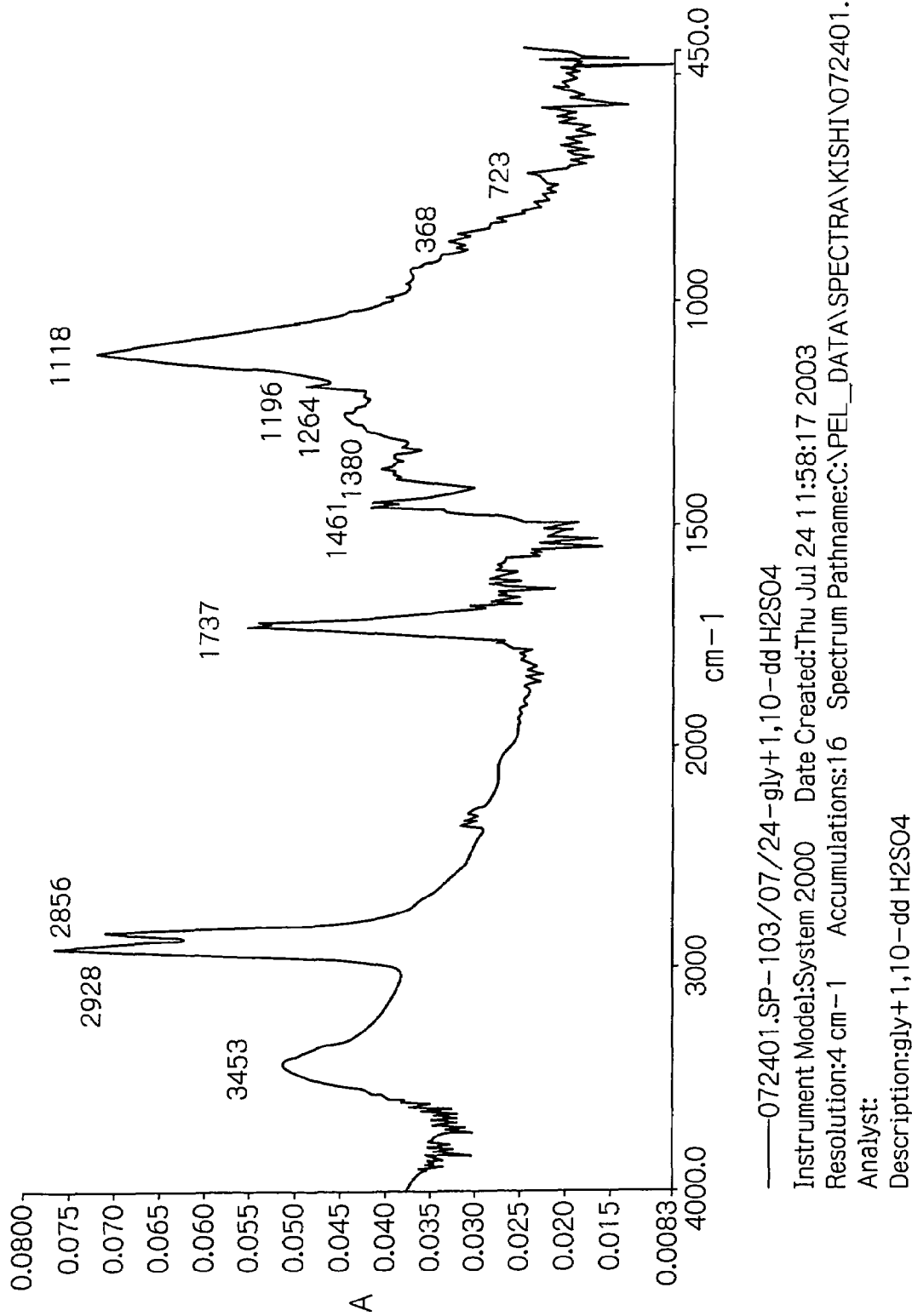
FIG. 3 shows an infrared absorption spectrum of aliphatic polyether ether ketone obtained in Example 2.

1 ml of glycerin (manufactured by KANTO CHEMICAL Co., Inc.), 4 ml of 1,10-decandiol (manufactured by KANTO CHEMICAL Co., Inc.) and 100 μl of a concentrated sulfuric acid (96% aqueous solution, manufactured by KANTO CHEMICAL Co., Inc.) are mixed, and stirred thoroughly. 1 ml of this mixed solution is dripped on a glass substrate, and the resultant is heated at a temperature of 160° C. for 15 minutes. In an infrared absorption spectrum of the product thus obtained (see FIG. 3), an absorption of a carbonyl group at 1737 cm$^{-1}$, and an absorption of an ether group at 1118 cm$^{-1}$ are observed. Accordingly, it is confirmed that an aliphatic polyether ether ketone comprising the structural unit represented by the Structural Formula (3) (m: 40, n: 5, weight average molecular weight: 9,000, and a ratio of ether groups to ketone groups: 2/1) is obtained.

Various properties of the plastic comprising the aliphatic polyether ether ketone plastic are shown below:
Elasticity: 1 GPa
Thermal decomposition temperature: 380° C.
Electrical conductivity: $10^{-10}$ S/cm

Example 2-1

An aliphatic polyether ether ketone, in which carbon nanotube is dispersed, is obtained in the same manner as in Example 2 except that 0.15 g of carbon nanotubes modified by carboxylic acid (prepared in the same manner as in Example 1-1) is used as a raw material.

Various properties of the plastic comprising the aliphatic polyether ether ketone plastic into which carbon nanotubes are dispersed are shown below:
Elasticity: 5 GPa
Thermal decomposition temperature: 380° C.
Electrical conductivity: $10^{-2}$ S/cm

Example 3

Figure 4:
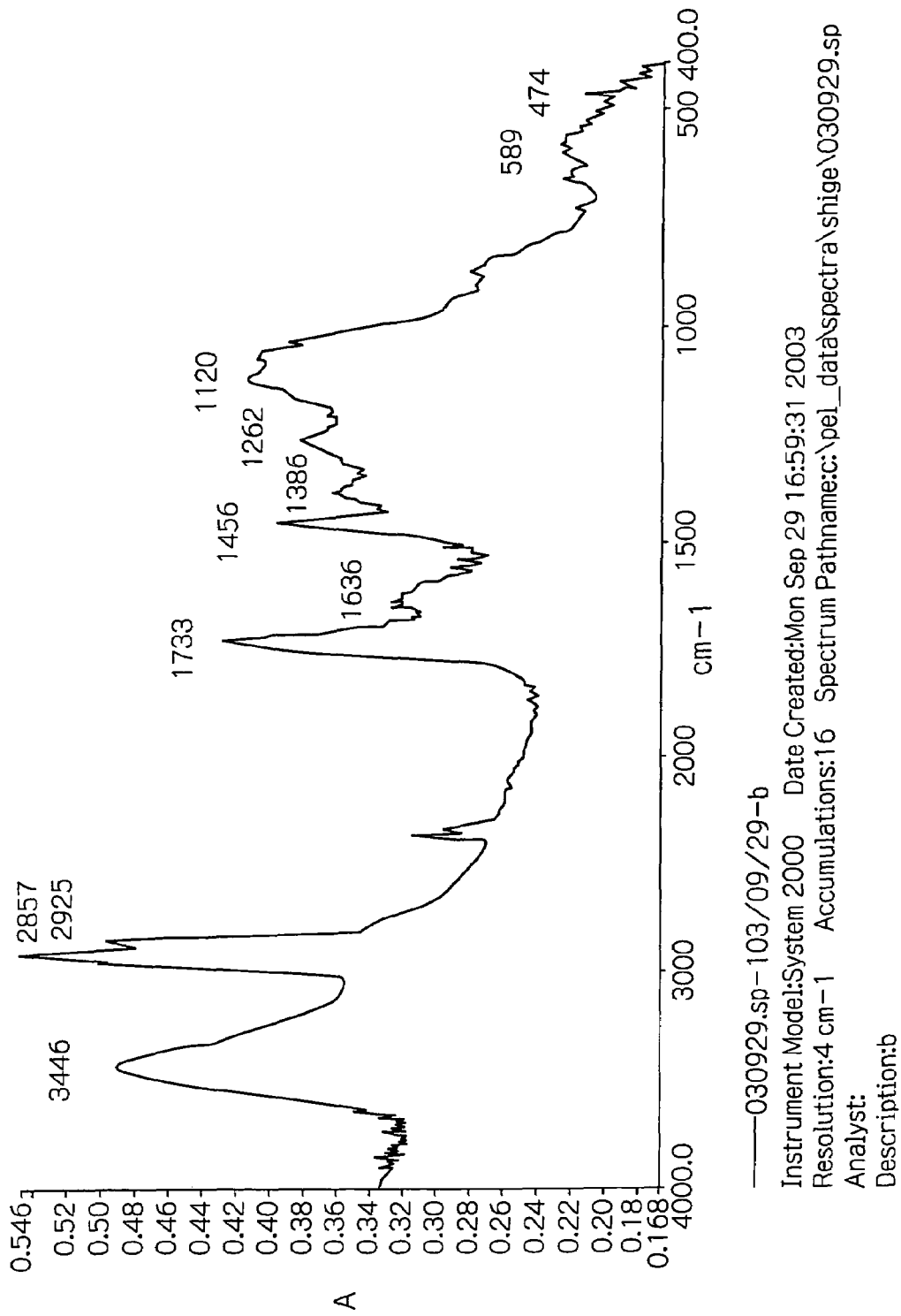
FIG. 4 shows an infrared absorption spectrum of a block copolymer of an aliphatic polyether ether ketone and polyether, obtained in Example 3.

1 ml of glycerin (manufactured by KANTO CHEMICAL Co., Inc.) and 100 μl of a concentrated sulfuric acid (a 96% of aqueous solution, manufactured by KANTO CHEMICAL Co., Inc.) are mixed, and stirred thoroughly. The mixed solution is heated at a temperature of 150° C. for 5 minutes (mixed solution A). 1 ml of ethylene glycol (manufactured by KANTO CHEMICAL Co., Inc.) and 100 μl of concentrated sulfuric acid (96% aqueous solution, manufactured by KANTO CHEMICAL Co., Inc.) are mixed, and stirred thoroughly. The mixed solution is heated at a temperature of 150° C. for 5 minutes (mixed solution B). Then, 1 ml of the mixed solution A and 1 ml of the mixed solution B are mixed, and stirred thoroughly, and thereafter, the mixed solution is dripped onto a glass substrate, and the resultant is heated at a temperature of 190° C. for 15 minutes. In an infrared absorption spectrum of the product thus obtained (see FIG. 4), an absorption of a carbonyl group at 1733 cm$^{-1}$ and an absorption of an ether group at 1120 cm$^{-1}$ are observed. Accordingly, it is confirmed that a block copolymer comprising an aliphatic polyether ketone structured by the structural unit represented by the Structural Formula (2) and polyether (namely, a block copolymer comprising the structural unit represented by the Formula (1) and the structural unit represented by the Formula (3)(n1: 60, 1: 40, k: 2, $R_1$ and $R_2$: H, weight average molecule weight: 6100, and a ratio of an ether group to a ketone group: 100/40)) is obtained.

Various properties of the plastic comprising the block copolymer are shown below:
Elasticity: 1 GPa
Thermal decomposition temperature: 380° C.
Electrical conductivity: 10$^{-10}$ S/cm

Example 3-1

A block copolymer comprising an aliphatic polyether ether ketone, in which carbon nanotubes are dispersed, and polyether is obtained in the same manner as in Example 3 except that 0.15 g of carbon nanotubes modified by carboxylic acid (carbon nanotubes prepared in the same manner as in Example 1-1) are used as a raw material.

Various properties of the plastic comprising the block copolymer plastic into which carbon nanotubes are dispersed are shown below:
Elasticity: 5 GPa
Thermal decomposition temperature: 380° C.
Electrical conductivity: 10$^{-2}$ S/cm

Example 3-2

A block copolymer comprising an aliphatic polyether ketone and polyether having OH groups is obtained in the same manner as in Example 3 except that concentrated nitric acid (60% aqueous solution, manufactured by KANTO CHEMICAL Co., Inc.) is used as a catalyst in the mixed solutions A and B in place of the concentrated sulfuric acid of Example 3-1. The block copolymer is a gel substance. However, the aliphatic polyether ketone sites in the block copolymer have a structure in which ketone groups are partially substituted by hydroxyl groups (the structure represented by the Structural Formula (2)).

After the gel substance is applied onto the substrate, it is heated at a temperature of 150° C., and a film-shaped plastic structural body is obtained. As a result, a film-shaped plastic structural body having the similar properties as those in Example 3-1 is obtained.

INDUSTRIAL APPLICABILITY

As described above, the present invention can provide an aliphatic polymer having a ketone group and ether bonding in its main chain which can be used for a structural material of a composition such as an engineering plastic. Further, the present invention can provide a resin composition containing therein an aliphatic polymer having a ketone group and ether bonding in its main chain.

What is claimed is:

1. An aliphatic polymer having a ketone group and ether bonding in its main chain, comprising a structural unit represented by the following Formula (1) and a structural unit represented by the following Formula (2),

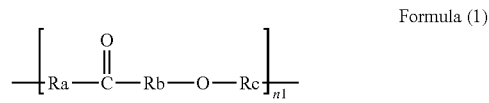

Formula (1)

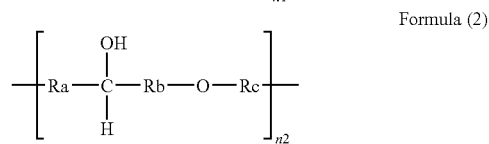

Formula (2)

wherein
Ra and Rb each independently represents a substituted or unsubstituted divalent aliphatic hydrocarbon group;
Rc represents a substituted or unsubstituted divalent aliphatic hydrocarbon group having an ether bonding in a terminal group thereof, or a single bond;
n1 represents an integer of 1 or more;
n2 represents an integer of 0 or more;
n1+n2 represents an integer in a range of 2 to 1000; and
the terminal group is selected from the group consisting of —OH, —COOH, —COOR, —COX, —NH$_2$ and —NCO, wherein R represents a substituted or unsubstituted hydrocarbon group, and X represents a halogen atom.

2. The polymer according to claim 1, wherein, in the structural units represented by the Formulae (1) and (2), each of Ra and Rb is CH$_2$, and Rc is a single bond.

3. The polymer according to claim 1, wherein, in the structural units represented by the Formulae (1) and (2), each of Ra and Rb is CH$_2$, and Rc is represented by —(CH$_2$)m—O—, wherein m represents an integer of 1 to 20.

4. The polymer according to claim 1, wherein a weight average molecule weight is in a range of 74 to 1,000,000.

5. The polymer according to claim 1, wherein the polymer has a cross-linking structure.

6. The polymer according to claim 1, wherein a ratio of a number of the ether bonds to a number of the ketone groups, represented by ether bonds/ketone groups, is in a range of 0.01 to 100.

7. The polymer according to claim 1, substantially structured as a repeating unit of the structural unit represented by the Formula (1).

8. The polymer according to claim 1, wherein the polymer is obtained by conducting a polymerization-reaction of a polyhydric alcohol as a raw material in a presence of a catalyst.

9. An aliphatic polymer having a ketone group and ether bonding in its main chain, wherein the aliphatic polymer having a ketone group and ether bonding in its main chain comprises structural units represented by the following Formula (1) and the following Formula (3) and may contain structural units represented by the following Formula (2):

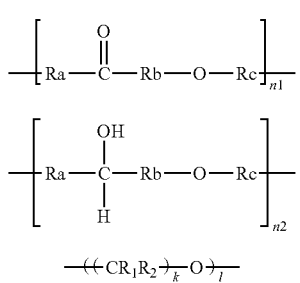

Formula (1)

Formula (2)

Formula (3)

wherein
Ra and Rb each independently represents a substituted or unsubstituted divalent aliphatic hydrocarbon group;
Rc represents a substituted or unsubstituted divalent aliphatic hydrocarbon group having ether bonding in a terminal group thereof, or a single bond;
R1 and R2 each independently represents H or an alkyl group;
k represents an integer of 1 or more;
l represents an integer in a range of 1 to 1000;
n1 represents an integer of 1 or more;
n2 represents an integer of 0 or more;
n1+n2 represents an integer in a range of 2 to 1000; and
the terminal group is selected from the group consisting of —OH, —COOH, —COOR, —COX, —NH$_2$ and —NCO, wherein R represents a substituted or unsubstituted hydrocarbon group, and X represents a halogen atom.

10. A resin composition, comprising a structural unit represented by the following Formula (1) as a component:

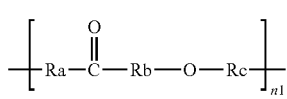

Formula (1)

wherein
Ra and Rb each independently represents a substituted or unsubstituted divalent aliphatic hydrocarbon group;
Rc represents a substituted or unsubstituted divalent aliphatic hydrocarbon group having an ether bonding in a terminal group thereof, or a single bond;
n1 represents an integer in a range of 2 to 1000; and
the terminal group is selected from a group consisting of —OH, —COOH, —COOR, —COX, —NH$_2$ and —NCO, wherein R represents a substituted or unsubstituted hydrocarbon group, and X represents a halogen atom.

11. The resin composition according to claim 10, further comprising an electrically conductive powder.

12. The resin composition according to claim 11, wherein the electrically conductive powder is metal fine particles.

13. The resin composition according to claim 11, wherein the electrically conductive powder is carbon nanotubes.

14. The resin composition according to claim 11, wherein carbon nanotubes modified by a functional group, which conducts a polymerization-reaction with the aliphatic polymer having the ketone group and ether bonding in its main chain, is used as the electrically conductive powder.

15. The resin composition according to claim 14, wherein the functional group is a carboxylic acid.

* * * * *